Dec. 24, 1940.　　　　S. L. WORSNOP　　　　2,225,849
SURFACE SPEED INDICATOR
Filed Feb. 8, 1938　　　3 Sheets-Sheet 1
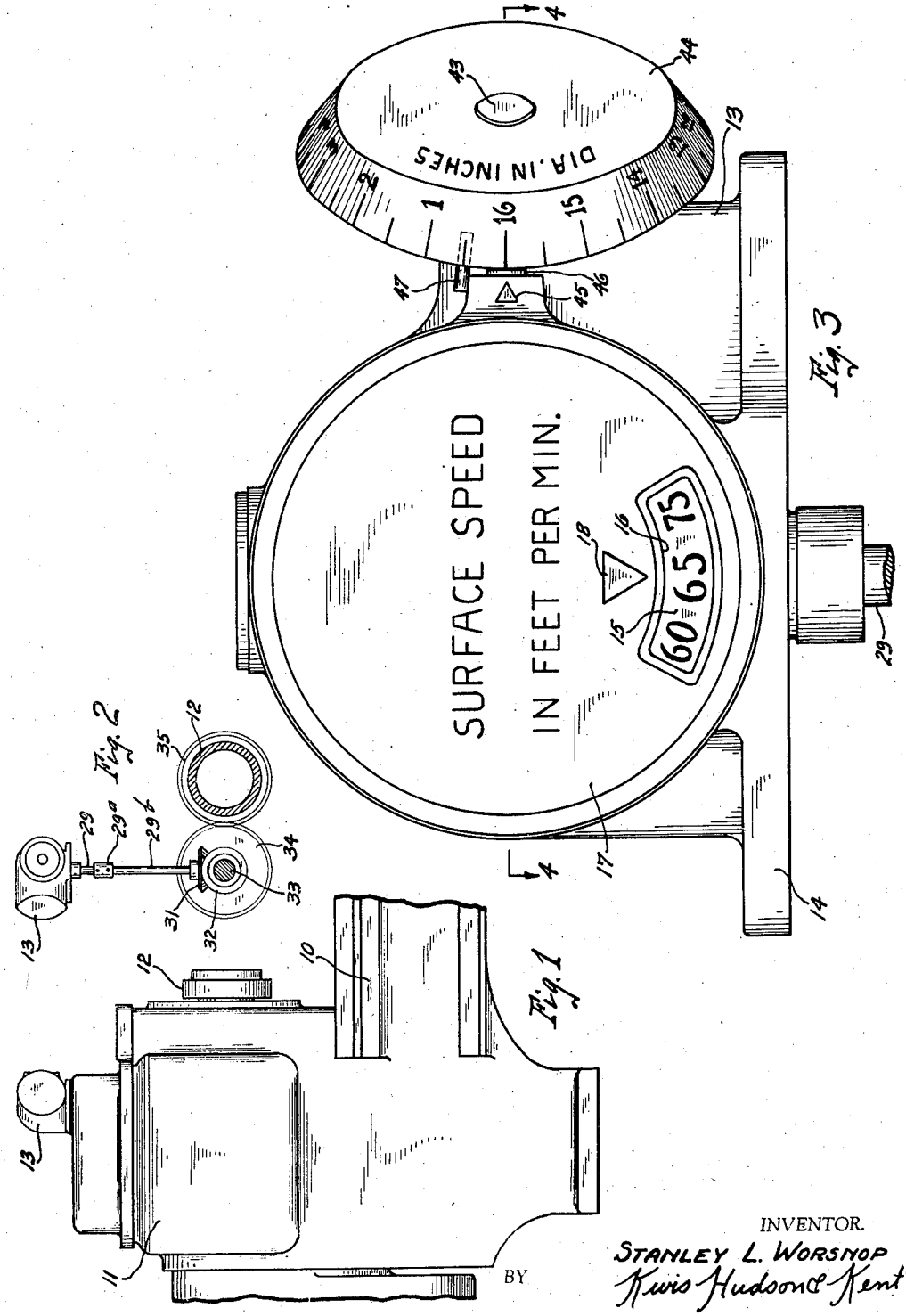
INVENTOR.
STANLEY L. WORSNOP
BY Kwis Hudson & Kent
ATTORNEYS Dec. 24, 1940.　　　S. L. WORSNOP　　　2,225,849
SURFACE SPEED INDICATOR
Filed Feb. 8, 1938　　　3 Sheets-Sheet 2

INVENTOR.
STANLEY L. WORSNOP
BY
ATTORNEYS

Dec. 24, 1940.   S. L. WORSNOP   2,225,849
SURFACE SPEED INDICATOR
Filed Feb. 8, 1938   3 Sheets-Sheet 3
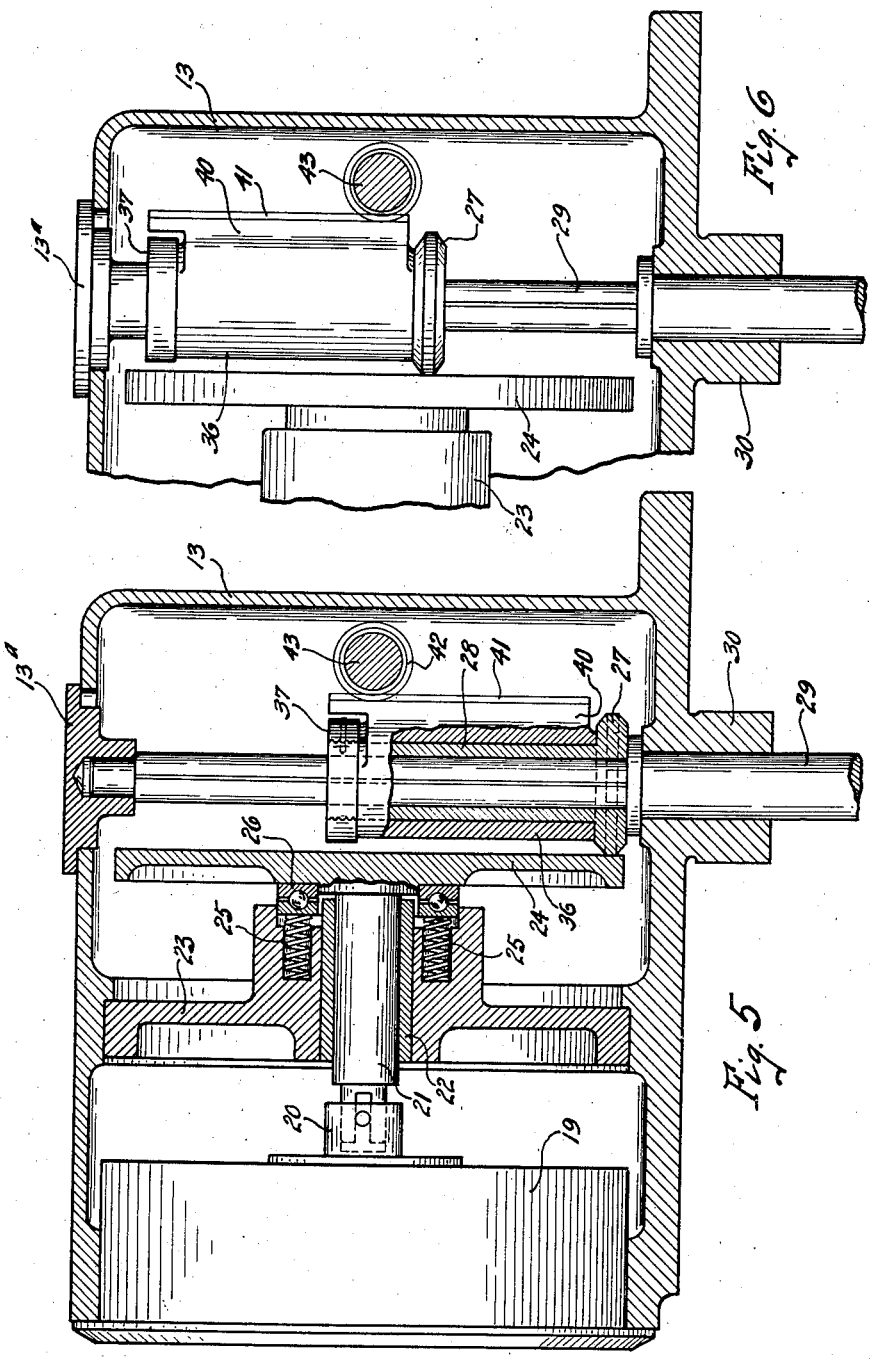
INVENTOR.
STANLEY L. WORSNOP
BY
Kwis Hudson & Kent
ATTORNEYS Patented Dec. 24, 1940

2,225,849

UNITED STATES PATENT OFFICE 2,225,849

SURFACE SPEED INDICATOR

Stanley L. Worsnop, East Cleveland, Ohio, assignor to The Warner & Swasey Company, Cleveland, Ohio, a corporation of Ohio Application February 8, 1938, Serial No. 189,415

2 Claims. (Cl. 264—2)

This invention relates to an indicator, and particularly to an indicator adapted to show the circumferential surface speed of a work piece with respect to the cutting tool operating thereon.

An object of the invention is to provide an indicator for use with a machine tool and by means of which the operator can determine the actual surface or cutting speed of the work piece relative to the cutting tool operating thereon in relation to the diameter of the portion of the work piece being machined by said tool.

Another object is to provide an indicator for use with a machine tool and of such character that the operator while the work spindle is rotating can set the dial of the indicator to a particular diameter of work piece and then the indicator will show the surface or cutting speed of the work piece in relation to such diameter for the particular speed at which the spindle then might be rotating.

Another object is to provide an indicator for use with a machine tool and which can be utilized by the operator to determine if the work spindle is rotating at the correct rate for obtaining the proper or desired surface or cutting speed of the work piece in relation to a given diameter, and if his determination shows that the rate of rotation of the spindle is incorrect for obtaining the desired or proper surface or cutting speed, the operator can then increase or diminish the rate of rotation of the spindle until the desired surface or cutting speed is indicated by the indicator.

Further and additional objects and advantages not hereinbefore enumerated will become apparent during the detailed description of an embodiment of the invention which is to follow and which embodiment is illustrated in the accompanying drawings, wherein Fig. 1 is a fragmentary front elevation of a portion of a machine tool and particularly the head stock thereof, the indicator being in this instance shown mounted on the top of the head stock.

Fig. 2 is a detailed diagrammatic view of the operative connection between the work spindle in the head stock and the indicator.

Fig. 3 is a front elevational view of the indicator as viewed by the operator standing in the usual operator's position.

Fig. 5 is a sectional view taken on the irregular line 5—5 of Fig. 4 looking in the direction of the arrows, and Fig. 6 is a fragmentary view similar to Fig. 5 but showing certain of the parts of the indicator in a different position.

Figure 4:
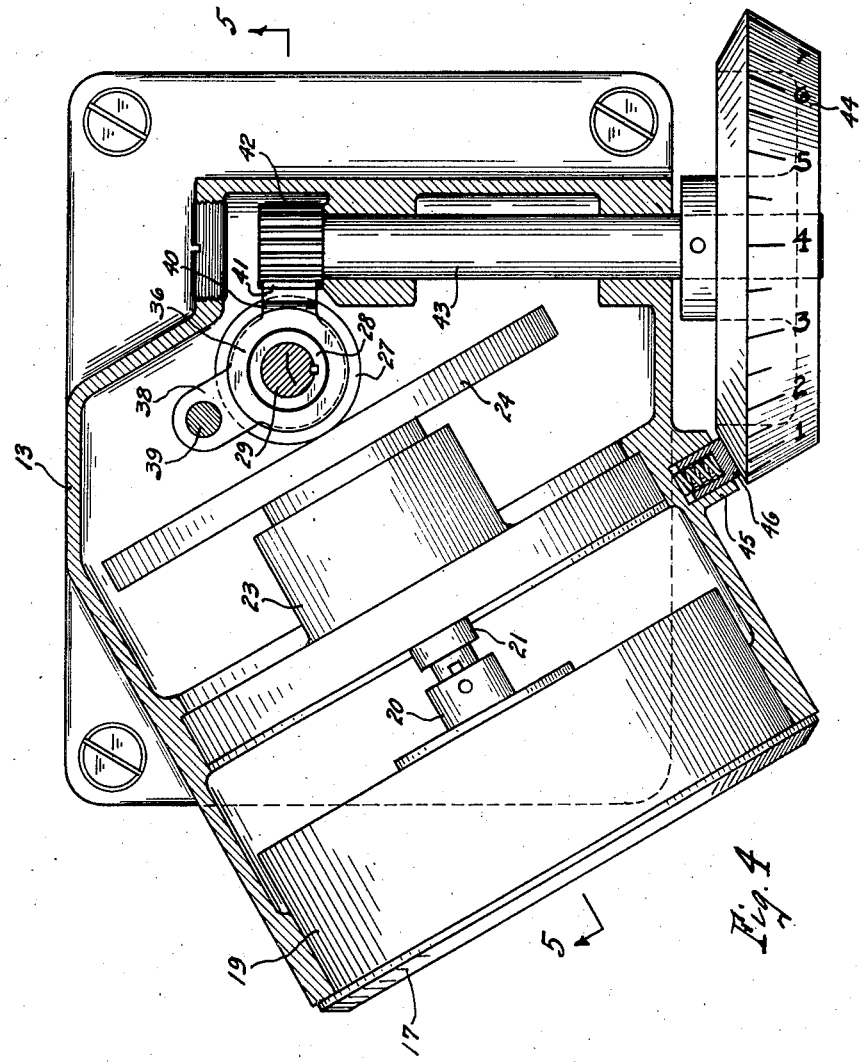
Fig. 4 is a sectional view through the indicator taken substantially on line 4—4 of Fig. 3, looking in the direction of the arrows.

In Fig. 1 there is shown a machine tool as, for example, a lathe, and which comprises a bed 10 provided with suitable ways and a head stock 11 located at one end of the bed and in which is mounted the usual work spindle 12 which, as will be well understood, is rotated at a plurality of different speeds through suitable change speed gearing in the head.

An indicator embodying the present invention is mounted, in this instance, on the top of the head 11, and comprises a housing casing 13 provided on its lower side with suitable attaching flanges 14, whereby the indicator can be bolted or otherwise secured to the head of the machine.

The housing casing 13 is formed of two angularly disposed portions, see Fig. 4, one of which houses the surface speed dial and in the other of which is mounted the shaft operated by the diameter dial later to be referred to. The indicator is so mounted on the top of the head as to have the surface speed dial facing the operator when he is standing in the normal position for operating the machine while the axis of the diameter dial will be substantially parallel to the axis of the work spindle.

A portion of the surface speed dial 15 is shown in Fig. 3 through the window 16 in a cover plate 17 that has marked thereon a fixed pointer 18 with which the surface speed indicia on the dial can be brought into line. The cover plate 17 also, in this instance, bears the notation "surface speed in feet per minute" as clearly shown in Fig. 3, but it will be understood that the surface speeds in other units of measurement might be indicated if so desired.

The surface speed dial 15 may be mounted on a usual tachometer unit 19, see Fig. 4, which unit has the customary driving sleeve 20. In this instance the driving sleeve 20 is operatively connected with a shaft 21, as clearly indicated in Fig. 5, and said shaft 21 is rotatably mounted in a bearing sleeve 22 carried by a bearing plate 23 arranged in the casing 13. The driving connection between the shaft 21 and the sleeve 20 is such that the shaft may have endwise movement for a purpose which will later become clear.

The end of the shaft 21 opposite to the end that is operatively connected with the sleeve 20 has, in this instance, integrally formed thereon a circular driving disk 24, which is normally urged toward the right as viewed in Fig. 5 by a series of springs 25 mounted in recesses formed in the bearing plate 23 and engaging with the antifriction thrust bearing 26. The outer or right hand surface of the driving disk 24, as viewed in Fig. 5, is thus held by the action of the springs 25 in frictional driving engagement with a relatively small disk or wheel 27 that is integral with a sleeve 28 splined on a driving shaft 29 so as to rotate therewith but move endwise thereof.

The shaft 29 is rotatably supported in a bearing boss 30 formed integral with the housing casing and in a bearing cap 13a at the top of the housing and said boss also acts as a pilot to position the indicator on the top of the head stock, since the boss is fitted into an opening formed in the head stock. The shaft 29 is connected through a suitable coupling 29a with a shaft 29b located in the head stock and provided at its lower end with a bevel pinion 31 that meshes with a bevel gear 32 fixed on a secondary shaft 33 that also has fixed thereto a gear 34 in turn meshing with a gear 35 that is fixed to the work spindle 12.

From the foregoing it will be observed that the shaft 29, wheel 27 and sleeve 28 are driven directly from the work spindle and that whenever the work spindle is rotating said shaft 29 and wheel 27 are also rotating. The sleeve 28 is mounted in a bearing sleeve 36 and said bearing sleeve 36 is held against endwise movement relative to the sleeve 28 by the wheel 27 and by the threaded collar 37 which is fixed to the sleeve 28. The bearing sleeve 36 is provided with a laterally extending integral portion 38 that has a vertical bore therethrough in which slidably fits a stationary guide rod 39 supported by the top and bottom walls of the housing casing.

It will be seen that due to the engagement between the portion 38 of the bearing sleeve and the guide rod 39 that said bearing sleeve is held against rotation but can have endwise movement on the shaft 29, it being observed in Fig. 4 that the rod 39 is parallel to the shaft 29. The bearing sleeve 36 is also provided with a second laterally extending portion 40 formed at its outer end into a rack 41 that meshes with a pinion 42 fixed to a horizontal shaft 43 rotatably supported in suitable bearings in the housing casing 13.

When the shaft 43 is rotated the bearing sleeve 36 and the sleeve 28 together with the wheel 27 will be moved upwardly or downwardly along the shaft 29 as the case may be. The shaft 43 extends outwardly of the housing casing and has fixed to its outer end the diameter dial 44 which, as has been previously stated, is provided with suitable indicia in this instance indicating diameters of the work piece in inches, and said indicia can be brought into registry with a fixed pointer 45, see Fig. 3, formed on the housing casing.

A spring pressed holding shoe 46 housed in the pointer portion of the housing frictionally contacts with the rim of the diameter dial 44 so as to hold said dial in the different positions to which the operator turns it and in turn to hold the sleeves 28 and 36 in the positions on the shaft 29 to which they have been moved by the rotation of the dial. In other words, the function of the holding shoe 46 is to hold the sleeves 28 and 36 and the wheel 27 in any position to which they might have been shifted by the rotation of the dial.

It will be noted that the movement of the sleeves 28 and 36 and the wheel 27 effected by the rotation of the dial causes the wheel 27 to engage with the surface of the disk 24 at varying radial distances from the center of the disk, wherefore the disk 24 can be rotated at varying speeds for a constant speed of the wheel 27 in relation to the varying radial distances from the center of the disk that the wheel 27 might be in. It will be understood that the different radial distances from the center of the disk in which the wheel 27 is positioned are directly related to different diameters of the work piece as, for example, in Fig. 6 the wheel 27 is positioned relative to the center of the disk for a work piece of one inch in diameter, while in Fig. 5 the wheel is positioned for a work piece of sixteen inches in diameter.

In order that the dial can be rotated through the full range of different diameters from 1 to 16 inches, the dial 44 is provided with a stop pin 47 that contacts with one or the other side of the portion of the housing casing upon which is arranged the pointer 45. In other words, and with reference to Fig. 3, it will be seen that if the operator wishes to change the indicator dial from being set for a work piece diameter of 16 inches to a work piece diameter of 1 inch, he must rotate the dial in a clockwise direction until the stop pin 47 engages with the opposite side of the portion of the housing casing upon which the pointer 45 is arranged than is indicated in Fig. 3, and correspondingly if he wishes to go from a work piece of 1 inch in diameter to one of 16 inches in diameter he must rotate the dial in an anti-clockwise direction a similar distance.

From the foregoing description it will be seen that the operator knowing the diameter of the work piece in inches turns the dial until the indicia representing such diameter is in line with the pointer 45, and thus he automatically varies the driving relationship between the wheel 27 and the disk 24 so that the rotation of the spindle will, through the shaft 29 and disk 24, cause a rotation of the disk 24 at the proper speed to indicate through the tachometer unit 19 and the dial 15 rotated thereby the surface or cutting speed in feet per minute of the spindle in relation to the particular diameter for which the dial 44 is adjusted.

The operator knowing the correct cutting speed at which the cutting tool is capable of operating upon the particular material being machined can then either increase or diminish the speed of rotation of the spindle until the dial 15 indicates substantially the correct cutting speed. In this way the operator will be able at all times to definitely check the speed at which the work spindle is rotating to determine if the tool is cutting at the correct surface speed in feet per minute and in this way avoid damage to the tool which would result if it were operating at too high a cutting or surface speed.

In addition, a foreman or some other person in charge can readily check an operator to determine if he is correctly operating his machine.

Although a preferred embodiment of the invention has been illustrated and described herein, it will be understood that the invention is susceptible of various modifications and adaptations within the scope of the appended claims.

Having thus described my invention I claim:

1. An indicator for indicating the surface speed of a work piece carried by the spindle of a machine tool in relation to the diameter of said work piece and comprising a rotatable surface speed indicating element, means for operatively connecting said element with said spindle and including a variable speed drive embodying an axially shiftable sleeve provided with rack teeth, a diameter indicating dial, a fixed pointer associated with said dial, a rotatable shaft mounting said dial and provided with a pinion meshing with said rack teeth whereby rotation of said dial adjusts said variable speed drive in relation to the diameter of the work piece, such that the surface speed indicated by said element is correlated to the diameter indicated by said dial and pointer.

2. An indicator for indicating the surface speed of a work piece carried by the spindle of a machine tool in relation to the diameter of said work piece and comprising two movable indicating elements, one of which is provided with indicia representing different diameters of work pieces and is rotatable and the other of which is provided with indicia representing surface speeds, means for operatively connecting the last mentioned element with said spindle and including a variable speed drive, means for varying said drive in relation to different diameters of work pieces, and means forming an operative connection between said rotatable indicating element and the last mentioned means for controlling the latter and such that a single complete revolution of said element can effect the entire range of variations in said drive.

STANLEY L. WORSNOP.